United States Patent Office 3,301,789
Patented Jan. 31, 1967

3,301,789
ZIRCONIUM REMOVAL FROM STRONTIUM-90
Lane A. Bray, Richland, Wash., assignor to the United States of America as represented by the United States Atomic Energy Commission
No Drawing. Filed Mar. 4, 1966, Ser. No. 534,286
2 Claims. (Cl. 252—301.1)

The invention described herein was made in the course of or under a contract with the United States Atomic Energy Commission.

The invention relates to a process of forming a filterable precipitate of $Sr^{90}$ carbonate which is substantially free of $Zr^{90}$, from an acidic solution containing both $Sr^{90}$ and $Zr^{90}$. The process comprises the following steps:

(1) Adding sufficient caustic to neutralize the solution to pH of substantially 1.
(2) Adding sufficient potassium acid carbonate to raise the pH to substantially 7.
(3) Adding sufficient potassium normal carbonate to produce a pH of at least 10.
(4) Digesting at 80–90° C.

This series of steps forms a precipitate which is almost free of zirconium and which is readily filterable.

Strontium-90 is useful as a self-contained heat source, particularly in thermo-electric generators. It is sometimes employed in the form of strontium titanate and sometimes as a different compound in which the proportion of strontium is higher than in the titanate. When used in satellites or other spacecraft it is desirable that the material be very pure in order to obtain the maximum ratio of power to weight.

Strontium-90 is a fission product formed in the irradiation of the fissionable isotopes of uranium and plutonium. It is obtained from the residues resulting from the chemical processing of irradiated nuclear fuel. The principal processes which have been employed are those of U.S. Patents 3,154,500, granted October 27, 1964, to Jansen et al., and 3,173,757, granted March 16, 1965, to Wheelwright et al.

In these processes the $Sr^{90}$ is recovered in the form of a solution in nitric acid and is almost completely free of metal ions other than sodium and calcium. However, $Zr^{90}$ is a non-radioactive daughter of $Sr^{90}$ and, on prolonged storage, a substantial quantity of zirconium grows into the purified strontium. Its presence in a strontium-90 heat source dilutes the fuel, lowers the specific power, and may cause undesirable changes in the physical and chemical properties of the fuel. For example, zirconium titanate is much more refractory than strontium titanate. If formed in the fuel, it may form particles containing inclusions of strontium which, in the event the flight of the spaceship is aborted, might not be vaporized in re-entry, but fall to the ground, causing objectionable radioactive contamination.

It is therefore desirable that the zirconium be removed shortly before the heat source is fabricated.

$Sr^{90}$ is ordinarily shipped from the producer to the heat source fabricators in the form of its carbonate, which is deposited from a slurry on filters enclosed in heavily shielded casks, such as are disclosed in U.S. Atomic Energy Commission Report HW–65268, Rev. 1, "HAPO–IB Fission Product Shipping Cask Evaluation Report."

I have found that by forming the carbonate in a particular manner the strontium may be recovered free of zirconium and in a readily filterable form.

Starting with an acidic solution, the critical features of my process are:

(1) Raising the pH from about 1 to 7 by the addition of potassium acid carbonate, $KHCO_3$;
(2) Raising the pH from about 7 to at least 10 by adding potassium carbonate $K_2CO_3$;
(3) Digesting the slurry thus formed at 80°–90° C.

My process is shown in more detail, and is compared with other closely similar processes, in the following examples. Examples 1 through 4 describe laboratory experiments. Example 5 describes a full scale production run.

EXAMPLE 1

A typical feed material, obtained by the process of the Jansen et al. patent, had the following composition:

$Sr^{+2}$ ------------------------------- 0.28 M
$Zr^{+4}$ ------------------------------- 0.007–0.014 M
$Ca^{+2}$ ------------------------------- 0.017 M
$Na^{+}$ -------------------------------- 2.0 M
$H^{+}$ --------------------------------- 0.5 M

Solutions were, therefore, made up of this composition. The strontium contained therein was, however, not the radioactive $Sr^{90}$ but the ordinary nonradioactive form of this element.

The pH was raised to 1 by the addition of 19 M NaOH, then to 7 by the addition of $KHCO_3$, and finally to 10.4 by the addition of $K_2CO_3$. NaOH is used to pH 1 because it does not interfere with the subsequent process and the acidic feed can be adjusted with a minimum volume change. The slurry of $SrCO_3$ was heated at 80°–90° C. for two hours and then filtered. About 95% of the zirconium was removed in the filtrate. Strontium recovery in the precipitate was quantitative. The precipitate was granular and readily filterable.

EXAMPLE 2

The procedure of Example 1 was repeated, except that NaOH was used in the final pH adjustment and the final pH was 11.6. The strontium recovery in the precipitate was again quantitative, but over 99% of the zirconium was also in the precipitate.

EXAMPLE 3

The process of Example 1 was repeated, except that 5 M $K_2CO_3$ was employed for the entire pH adjustment from pH 1 to pH 11.4. In this case, 35% of the zirconium remained in the precipitate.

EXAMPLE 4

The process of Example 1 was repeated except that 3 M $KHCO_3$ was employed for the entire pH adjustment from pH 1 to pH 8.9, which was the highest pH value that could be obtained with this agent. Recoveries were the same as for Example 1. However, the large volume of $KHCO_3$ required above pH 7, a volume equal to that of the original solution, makes the process unattractive. Moreover, while on this laboratory scale experiment the properties of the precipitate were satisfactory, it has been found in practice that in large scale production it is necessary that the pH be brought to at least 10 in order to insure satisfactory precipitation throughout the batch. The corresponding sodium salts are chemically equivalent to the potassium salts in this process. However, their comparatively low solubility makes it necessary to use excessively large quantities of solution or, in lieu thereof, the metering of solid reagent, which is unsatisfactory.

EXAMPLE 5

A 210 liter batch of $Sr^{90}$ solution was produced at the U.S. Atomic Energy Commission's Hanford Works, located at Richland, Wash., by the process of U.S. Patent 3,154,500. Approximately 17 liters of 19 M NaOH were added to increase the pH to about 1.0. Approximately 97 liters of 3 M $KHCO_3$ were then added followed by 95 liters of 5 M $K_2CO_3$. The slurry formed was digested at 80°–90° C. for about two hours. After cooling the slurry to 25°–35° C., the slurry was passed through a HAPO–IB filter cask (identified above). The strontium carbonate precipitate was retained on the filter in the cask.

The loaded cask was shipped to the Oak Ridge National Laboratory, Oak Ridge, Tennessee. There the precipitate was dissolved by circulating nitric acid through the cask. The resulting solution is hereafter termed the "product." The product was analyzed at ORNL and a sample was also returned to Hanford and there analyzed. Both analyses determined the zirconium concentration to be less than 0.01 gram/liter. Table I summarizes the quantities and compositions of the various solutions. (The amount of strontium is given in curies.)

Table I

|          | Vol., Liters | Sr, Ci/l. | Zr, g./l. | $HNO_3$, M | Zr, Grams |
|----------|--------------|-----------|-----------|------------|-----------|
| Feed     | 210          | 1,790     | 0.14–0.5  | 1.5        | 29–105    |
| Filtrate | 475          | 5         | 0.12      | 0.6        | 57        |
| Product  | 650          | 528       | <0.01     | 0.5        | <5        |

Some difficulty was had in the analysis for zirconium in the feed and the values are somewhat uncertain, as indicated. Based on the length of time between the purification of the strontium by solvent extraction and the analysis, and the rate of formation of $Zr^{90}$ by $Sr^{90}$ decay, the value of 0.5 g./l. was believed to be the more accurate. The material balance, however, indicates an initial concentration of about 0.3 g./liter. The analysis of the filtrate was believed to be the most accurate because this solution was so much less radioactive than the feed or the product.

While I have disclosed examples of the process in detail, it is obvious that variations are possible. For example, while in Example 5 the process was used as part of the "loadout" for shipment, it may also be used as in connection with the fabrication of a heat source. I therefore wish my invention to be limited solely by the scope of the appended claims.

The embodiments of the invention in which an exclusive right or privilege is claimed are defined as follows:

1. A method of recovering strontium substantially free of zirconium from an acidic solution containing strontium ions and zirconium ions which comprises:
   (a) adding sufficient caustic to neutralize said solution to a pH of substantially 1.
   (b) adding sufficient potassium acid carbonate, $KHCO_3$, to raise the pH to substantially 7.
   (c) adding sufficient potassium carbonate, $K_2CO_3$, to raise the pH to at least 10, and,
   (d) digesting the slurry thus formed for an extended period at a temperature of 80°–90° C.

2. A process as defined in claim 1 wherein the strontium is strontium-90 and the zirconium is zirconium-90 formed by the radioactive decay of said strontium.

References Cited by the Examiner
UNITED STATES PATENTS

| 3,010,788 | 11/1961 | Glueckauf | 23—66 X |
| 3,093,452 | 6/1963  | Newby     | 23—327  |
| 3,154,500 | 10/1964 | Jansen et al. | 252—301.1 |
| 3,161,599 | 12/1964 | Black     | 252—301.1 |

References Cited by the Applicant

J. W. Mellor: "A Comprehensive Treatise on Inorganic and Theoretical Chemistry," vol. VII, p. 160 and 161.

CARL D. QUARFORTH, *Primary Examiner.*

S. J. LECHERT, Jr., *Assistant Examiner.*